Figure 1:
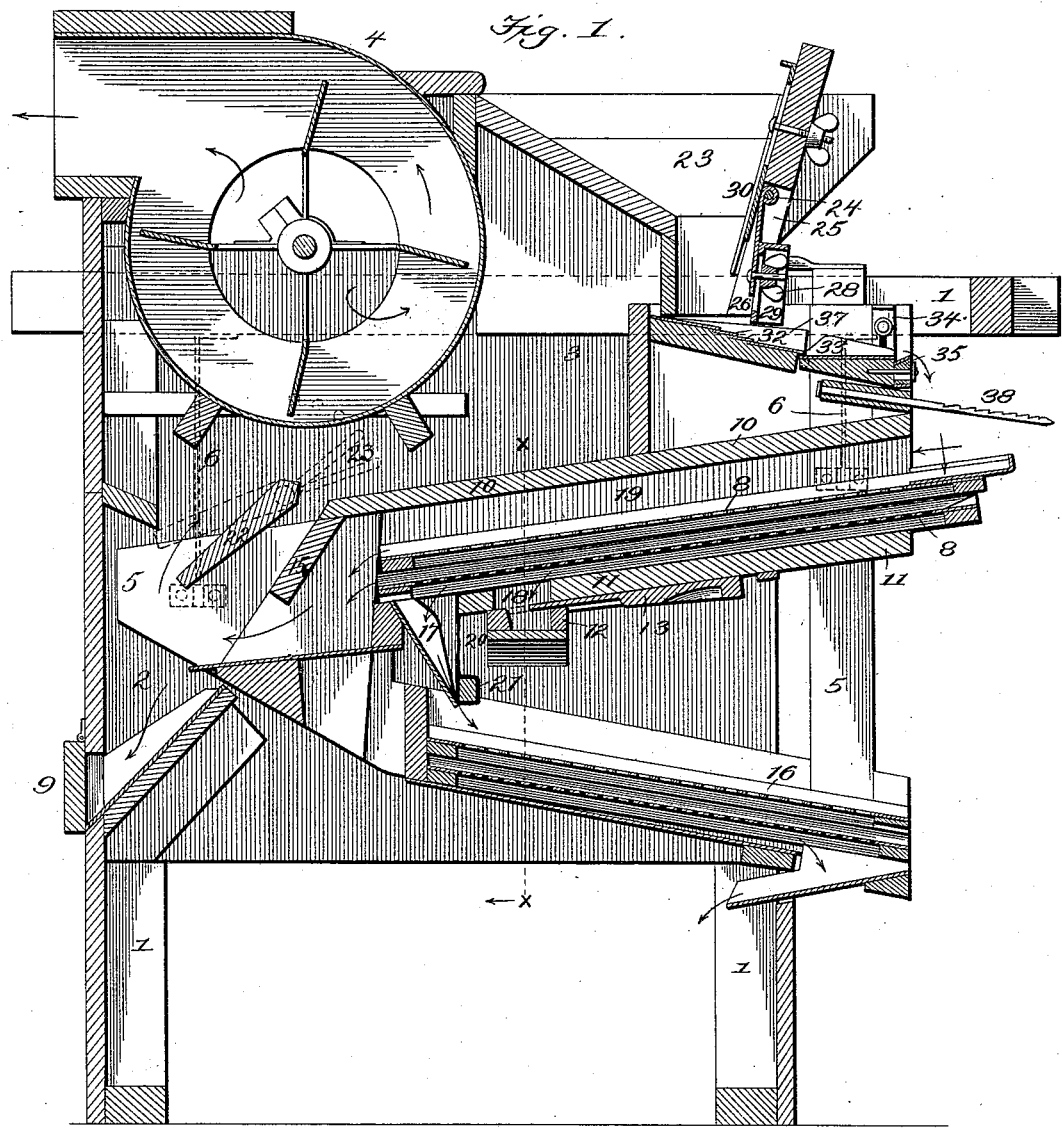

(No Model.) 3 Sheets—Sheet 1.

C. CLOSZ.
MACHINE FOR CLEANING AND SEPARATING GRAIN.

No. 532,415. Patented Jan. 8, 1895.

Witnesses.
A. R. Johnson
Edwin L. Bradford

Inventor.
Charles Closz
by Johnson & Johnson
His Attorneys.

(No Model.) 3 Sheets—Sheet 2.
C. CLOSZ.
MACHINE FOR CLEANING AND SEPARATING GRAIN.
No. 532,415. Patented Jan. 8, 1895.
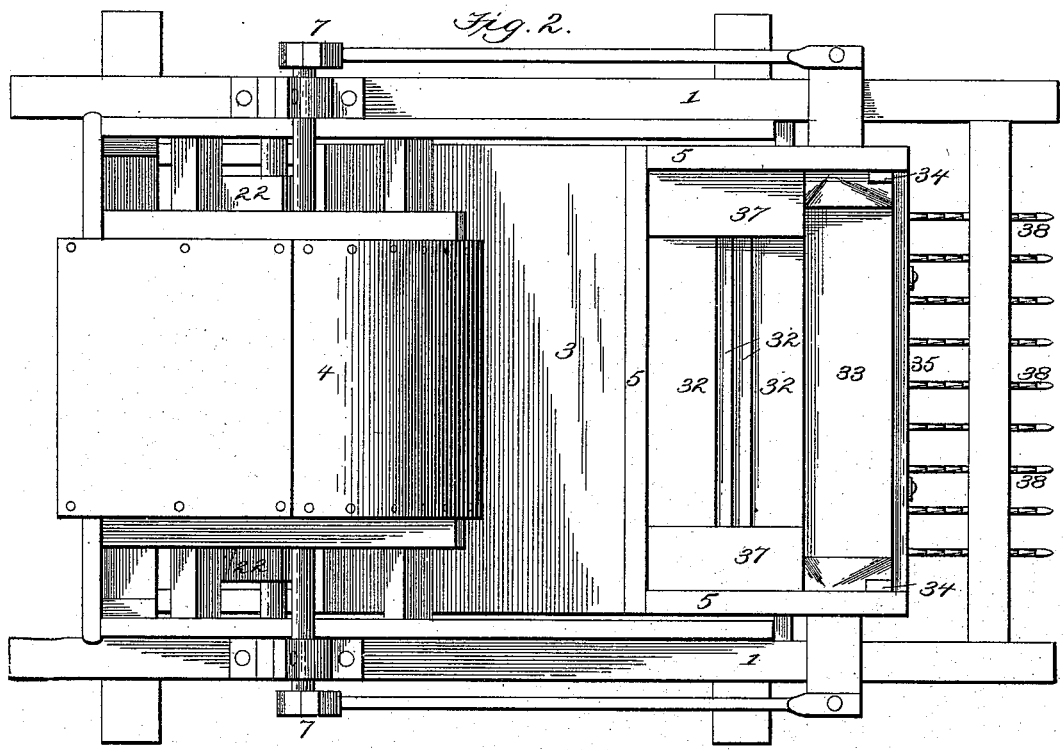
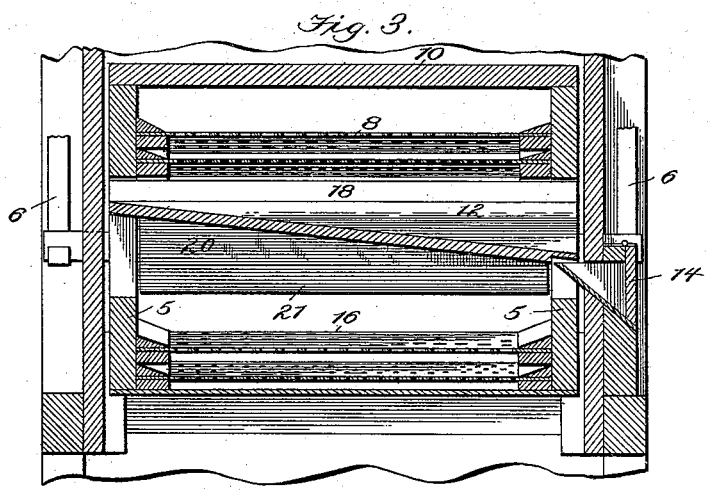

(No Model.) 3 Sheets—Sheet 3.
C. CLOSZ.
MACHINE FOR CLEANING AND SEPARATING GRAIN.
No. 532,415. Patented Jan. 8, 1895.
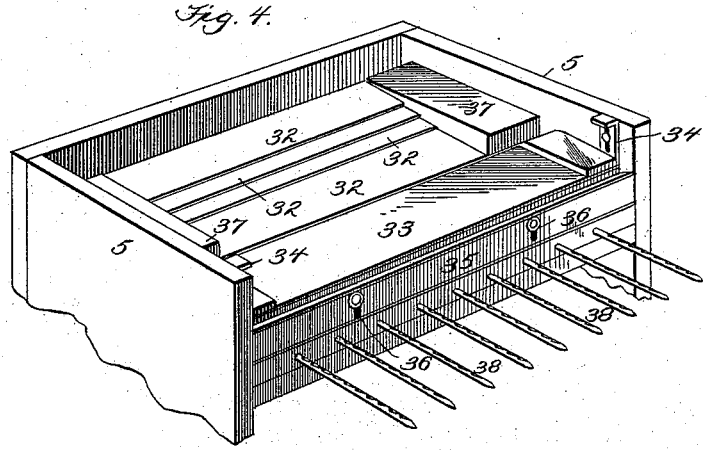
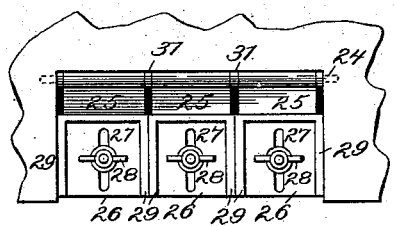
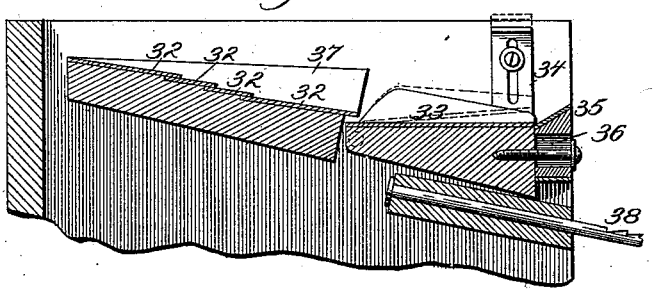 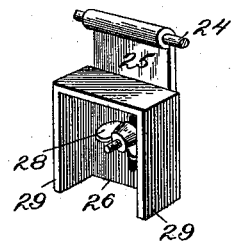

UNITED STATES PATENT OFFICE.

CHARLES CLOSZ, OF WEBSTER CITY, IOWA, ASSIGNOR TO THE CLOSZ AND HOWARD MANUFACTURING COMPANY, OF SAME PLACE.

MACHINE FOR CLEANING AND SEPARATING GRAIN.

SPECIFICATION forming part of Letters Patent No. 532,415, dated January 8, 1895.

Application filed March 31, 1894. Serial No. 565,842. (No model.)

*To all whom it may concern:*

Be it known that I, CHARLES CLOSZ, a citizen of the United States, residing at Webster City, in the county of Hamilton and State of Iowa, have invented certain new and useful Improvements in Machines for Cleaning and Separating Grain, of which the following is a specification.

My invention is directed to the improvement of machines for cleaning and separating grain and seeds and the particulars of my said invention will be pointed out in the claims concluding this specification.

The machine comprises a suitable frame-structure open at the front end, within which are arranged and supported the several co-acting parts of the machine. At the top of this frame-structure is constructed an air-chamber within which is arranged a suction-fan constructed to deliver the cleaning blast at the rear and top of the machine.

At the front and top of the machine is arranged in fixed relation thereto, a hopper for feeding the grain to the separating and cleaning sieves which are arranged within a frame or shoe below the air-chamber and through which sieves the air is drawn by the fan. The sieve-frame or shoe is open at the front and is suspended and vibrated within the frame-structure and carries a feed regulating and distributing tray-device forming a movable bottom for the hopper, and from which the grain is delivered directly upon the sieves.

The improvement which is the subject of this patent consists among other things in provisions whereby a continuous free feed from the hopper is rendered certain, regulated and controlled; and in a novel construction of an adjustable tray feed-device whereby the flow of the grain to the sieves is controlled and regulated.

My said improvement also consists of certain novel parts and combinations of parts whereby the separation and cleaning of the grain from all foreign matter is rendered effective and satisfactory under all conditions in which it is supplied for milling, as I shall now proceed more fully to state.

In the accompanying drawings I have illustrated a machine embodying my invention, in which—

Figure 1 shows such machine in vertical longitudinal section. Fig. 2 is a top view, the hopper and air-chamber covers being removed. Fig. 3 is a vertical transverse section taken through the discharge passage for the screenings and grain on the line $x-x$ of Fig. 1. Fig. 4 is a perspective view of the feed-tray; and Fig. 5 is a vertical section of the same. Fig. 6 is a front view of the hopper feed-gates; and Fig. 7 shows one of the feed gates.

The cleaned grain is discharged at the front of the machine and the cleanings and foreign matters are discharged at the rear end of the machine. The rear end of the frame-structure 1 is closed to form a diving-chamber 2 into which foreign matters from the screens are discharged. The air-chamber 3 is above and opens into the diving-chamber. The fan casing 4 is placed within the air-chamber, communicates with it and opens at the rear for the discharge of the air drawn up through the sieves. The shoe-frame 5 which contains the screens is hung within the frame-structure by hangers 6, Figs. 1 and 3, two on each side, and its rear end opens into the diving-chamber, while its front end preferably projects beyond the front end of the frame-structure. The screen containing shoe-frame is reciprocated horizontally by means of two eccentrics 7, one on each end of the fan shaft and is mounted in bearings on the top of the frame-structure. The top screens 8, which I prefer to have of different mesh, are placed so as to incline toward the rear and to deliver the foreign matters which pass over the screens into the diving-chamber, from which they are discharged through a self closing gate 9. The top screens are placed between an imperforate top board 10, and an imperforate bottom board 11, both inclining toward the rear and in this bottom is placed near its lower end a transverse trough 12, which is controlled by a slide valve 13 in said bottom. This trough inclines toward one side and opens at the side of the machine by a gravity valve 14, for the discharge of such fine stuff and grain as may pass through the screens upon said bottom board. These imperforate boards form a closure and passage for confining the air-draft to the screens. At the rear end of this passage the top board is inclined at 15 downward so as to direct the air currents to carry the light stuff and also the coarse matters into the diving-chamber, as it passes off the screens. This downward direction of the air currents holds the draft even and in a direct line through the screen-closure and prevents the lifting action of the grain on the screens which would tend to carry the grain over the screens too rapidly.

Below the imperforate bottom 11 of the screen-closure is arranged a second set of screens 16, which incline downward to the front and upon which the grain passes from the upper sieves. The object of these lower sieves is to separate small seeds from the grain, and, from the drawings, it will be seen that they have no communication with the air-draft closure 19, but receive the grain from the upper sieves through a valve controlled diving-passage 17, at the rear end of the imperforate bottom, as I shall presently state. The upper sieve of the upper series, projects out beyond its containing shoe-frame and is imperforate in a portion of such projecting part to receive the grain from a tray feed-device which I shall presently describe.

The grain in moving down the top sieve passes with the fine stuff through the series of sieves upon the bottom board 11 and from which a part of the grain and the fine stuff will pass through the transverse trough opening 18 in said bottom and into and out of the trough 12 at the side of the machine; while the other part of the grain and fine stuff, will, on moving farther down the bottom pass through the diving-passage 17, upon the lower series of sieves. Both these bottom openings are provided with valves, the one for the transverse trough, being a slide 13, fitted in guides on the under side of the bottom and accessible from the front for adjustment to open and to close the same, or to regulate the size of such trough opening in the board, the intention of this trough opening being to permit the light stuff and some of the grain to pass into the side inclined trough, while the balance of the grain moving down the bottom board will pass therefrom into the diving-passage upon the lower sieve at its highest end. As this diving-passage if left open would allow the air to be drawn up into the machine and thereby lessen the force of the air-draft through the upper screen-closure, I provide for closing this passage at its outlet by means of a valve 20, which I prefer to make of canvas with a weighting bar 21, at its lower edge, so that it will rest against the lower edge of said passage 17 and keep it closed against the upward flow of air-currents, while the pressure of the grain within the passage will open the valve in passing down upon the lower sieve. As the inclined side discharging trough is also provided with a gravity closing valve 14 at the outer side of the machine, the air is prevented from being drawn up into the sieve-closure 19 through the trough opening and in this division of the discharge of the grain passing down the bottom board the grain will be more thoroughly subjected to the action of the air-currents drawn into the machine. For the purpose of regulating the force of the air-suction through the sieve-closure I provide a valve 22, placed transversely in the frame-structure just above the inner open end of the sieve-closure, and made adjustable by an arm 23, at the outer side of the frame-structure, so as to open and close more or less the passage from said closure to the air-chamber. It will be understood that the function of this valve 22, is to increase or decrease the force of the air-draft through the sieve-closure and for this purpose this valve can be set to give more or less force to the draft drawn directly through the sieve-closure. It is important also to notice that this valve is arranged just behind the fixed inclined part 15 at the inner end of the top board of the sieve-closure, so that this valve can have no effect in changing the air currents upward or downward through the sieves. The inner end of the sieve containing shoe-frame makes a substantially close joining with the upper edge of the diving-chamber 2 and over this edge the rear end of said sieve shoe-frame, extends on a level below the bottom board of said sieve-closure and beneath the inclined end board 15 and the valve. The air-draft which passes through the sieve-closure, passes also downward through the sieves, carrying the light stuff into the diving-chamber and up through the fan case, which communicates at each end with the top air-chamber.

Grain in its uncleaned condition usually contains some large foreign substances, such as small ears of corn, cobs, and bunches of which cause considerable trouble and annoyance in obstructing the feed from the hopper in the cleaning operation. For effecting a satisfactory feed of the grain from the hopper I have provided a novel construction of independently acting feed-gates which I will now describe. The hopper 23 opens upon a feed-tray so that the feed is under the front wall of the hopper. This front wall along its outlet edge I make of a series of gravity gates each hung independently upon a rod 24 so that their edges join and form a sectional wall, each section being adapted to open or move outward to permit the passage of a substance larger than the grain, under its edge. In this operation it will be understood that the sectional gates are normally set with their lower edges in the same plane leaving a space between them and the surface of the tray, for the outflow of the grain in a thin sheet. The horizontal rod 24 upon which these gate-sections are hung, is fixed to the hopper wall and I prefer to make each gate section of two parts. The hinged part proper is a leaf 25, preferably of thin metal. The other part which forms the feed-edge, is preferably a light casting 26 and has a vertical slot 27 by which it is adapted for vertical adjustment by a thumb-nut 28, to align their lower edges and to regulate the feed space under them. These adjustable parts are formed with vertical sides 29, projecting outward so that, as they may be opened or pushed out independently of each other, the openings between them will be closed to prevent the outflow of the grain at points above their lower edges. These adjustable parts also form weights which tend to maintain the gate sections in their normal positions, to accurately regulate the flow of grain and to prevent the irregular and undue quantity of grain passing out with the larger bodies of foreign matters. As these gate sections are pushed out by the feed of the grain from the hopper, which constantly presses against them, it is important to regulate this pressure from the grain in the hopper. This I do by means of a gage-plate 30, supplementing the inner sides of the hanger-plates 25 of said gate-sections, so that by raising and lowering this gage-plate, it will cover more or less of the hanger-plates and thereby expose more or less of their surfaces to the outward pressure of the grain and thus control the flow of the grain. By raising this gage-plate the pressure of the grain against the gate sections, will be increased causing them to be pushed out to a greater extent from their normal positions and consequently increasing the flow of the grain and vice-versa; but whatever its adjustment it will allow any large substance with the grain to pass with it from the hopper without materially interrupting the regular flow of the grain. I prefer to make the hanger plates of less width than their adjustable sections, and to separate them by washers 31 on the rod, leaving the weight sections to join each other.

Immediately below and co-operating with the hopper feed-gates, is a tray of novel construction for feeding the grain upon the sieves. This tray forms the bottom of the hopper, and is fixed in the upper front end of the sieve containing shoe-frame, so that it forms a reciprocating bottom for the fixed hopper. That part of the tray directly beneath the hopper is formed of stepped surface by means of parallel transverse plates 32, those occupying a position centrally with the bottom of the hopper being preferably comparatively narrow and terminating under the edges of the hopper feed-gates. This construction gives to the edges of the plates 32, a pushing action on the grain, moving it forward by a positive force while it also moves down the inclining surface by gravity, by the reciprocating movement of the shoe. The shoulders formed by the edges of these plates serve to push the grain and any large bodies down against the gate sections and under and free of them so that there can be no choking or clogging of the hopper. Co-acting with this stepped surface of the tray is an adjustable delivery part 33 hinged just under the lowest edge of the stepped part and extending about even with the front of the shoe-frame, to the sides of which its delivery edge is connected by slotted hangers 34 by which to set it higher or lower so that its surface will be inclined upwardly more or less, from the downwardly inclined stepped surface for the purpose of regulating the volume of the flow of the grain as it passes from the hopper. At its front edge this hinged tray section 33, has a vertically adjustable overflow-ridge 35, to assist the function of the hinged part in regulating and controlling the delivery of the grain to insure an even and regular flow upon the sieves. This overflow-ridge, is made adjustable by slots 36 so that it can be set either above or below the surface of the hinged section; or it may be dispensed with. Beneath each end of the hopper, the tray has level parts 37 which extend beyond the hopper feed-gates to prevent the outflow of the grain around the edges of the end gates. Just below the overflow-ridge, a series of fingers 38 project in a row forward on a slightly downward incline between which the grain freely falls upon the upper end of the top sieve, while the bulky substances are carried off beyond the sieve. I prefer to form the upper edges of these fingers with teeth of sawtooth shape, so as to give a propelling action to the substances thereon and carry them off better than smooth fingers would do, it being understood that such propelling action is caused by the end shake of the shoe.

In the drawings I have illustrated a grain separator embodying in total combination all the features of improvement which constitute my present invention. Those improvements are not, however, all necessarily connected or combined in this way, but they or some of them may be employed separately or together in grain separators otherwise different in general operation and construction from that shown. Nor is it intended that my improvements are confined to the precise details of construction shown as it is obvious that immaterial departures may be permitted from the general and specific construction and arrangement of the parts contributing to my invention.

I claim as my improvement—

1. In a grain separator, a hopper-feeding device consisting of a hopper having a vertically adjustable slide gage on its front wall and a feed regulating gate composed of a multiplicity of independent gravity acting sections depending in front of said slide gage.

2. In a grain separator, a hopper feeding device consisting of a hopper having a vertically adjustable slide gage on its front wall, a regulating gate composed of a multiplicity of independent gravity acting sections depending in front of said slide gage, each gate section having a vertically adjustable part on its outer wall.

3. In a grain separator, a hopper feeding device consisting of a hopper having a vertically adjustable slide gage on its front wall, and a gate composed of a multiplicity of independent gravity acting sections depending in front of said slide gage, each gate section having a vertically adjustable part on its outer wall provided with outward standing wings at each edge, substantially as described.

4. In a grain separator, a hopper feed gate composed of a multiplicity of independent gravity acting sections, each section provided with outward standing wings at each edge, whereby to form closed joints between the edges of the sections for the purpose stated.

5. In a grain separator, the combination of a hopper feeding device composed of a gate formed of a multiplicity of independent gravity acting sections, each section provided with outward standing wings at each edge, with a reciprocating tray forming the bottom of said hopper.

6. In a grain separator, the combination of a hopper-feeding device composed of a gate formed of a multiplicity of independent gravity acting sections, each section provided with outward standing wings at each edge, with a reciprocating tray forming the bottom of said hopper, having a transverse stepped surface whereby to form pushing shoulders to give a positive feed of the grain and other matter under the gate sections.

7. In a grain separator, the combination with a fixed hopper, of a tray arranged to form the bottom of said hopper to hold the grain therein and permit its flow therefrom, of a delivery section hinged to said tray-bottom on a plane therewith and outside of said hopper, means for reciprocating said hinged parts and means for adjusting the inclination of the hinged part relatively to the surface of the tray-bottom.

8. In a grain separator, the feed-device herein described consisting of the hopper 23, the tray 32 arranged to form the bottom of said hopper to hold the grain therein and permit it to flow therefrom, a delivery section hinged to said tray section on a plane therewith and outside of the hopper, an overflow ridge 35 at the edge of said hinged section, means for adjusting the inclination of the hinged part relatively to the plane of the tray-bottom and means for adjusting the height of the overflow ridge relatively to the surface of the hinged section.

9. In a grain separator, the combination, with a hopper supplying device, of a reciprocating frame, the two sets of screens arranged therein, the upper set between the boards 10, 11, the bottom of one of which has the opening 17 which opens upon the lower set of screens and is controlled by a gravity acting valve 20, discharging upon the lower screens, substantially as described.

10. In a grain separator, the combination, with a hopper supplying device, of a reciprocating shoe-frame, sieves arranged therein between boards 10 and 11, the bottom board having two openings therein, one, 17, of which opens within the frame and is controlled by a gravity acting valve 20 and the other 18 is controlled by a slide valve 13 and opens into a trough 12 discharging at the side of said frame, for the purpose stated.

11. In a grain separator, the combination, with a hopper supplying device, of a reciprocating frame, the sieves 8, arranged between the boards 10 and 11, the bottom board having the end opening 17 which is controlled by a gravity acting valve 20 discharging within the frame, and an adjacent opening 18 in said bottom controlled by a slide valve 13 discharging into a tray 12 which is controlled by a gravity acting valve 14, at the side of said frame, for the purpose stated.

12. In a grain separator, a hopper supplying device consisting of a fixed hopper having a feed regulating gate composed of independent gravity acting sections, a feed tray having an inclined stepped bottom, cooperating with said gate sections, and a delivering hinged tray section having an unbroken surface.

13. In a grain separator, the combination, with a fixed hopper feeding device and the fan, of a reciprocating shoe-frame, the sieves 8 arranged between the boards 10 and 11, the top board 10 terminating in a fender part standing downward over the inner ends of said sieves, and the valve 22 placed between the said fender and the fan, whereby the draft is caused to have a downward direction from the sieves and its force regulated.

CHARLES CLOSZ.

Witnesses:
GEO. WAMBACH,
ALTA LIGHT.